United States Patent
Schurch et al.

(10) Patent No.: US 11,394,314 B2
(45) Date of Patent: Jul. 19, 2022

(54) CONTROL METHOD OF A DC/AC CONVERTER

(71) Applicant: Schneider Electric Industries SAS, Rueil Malmaison (FR)

(72) Inventors: Thomas Schurch, Cuvat (FR); Mustapha Rahmani, Saint Martin d'Hères (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 48 days.

(21) Appl. No.: 16/838,794

(22) Filed: Apr. 2, 2020

(65) Prior Publication Data
US 2020/0343825 A1    Oct. 29, 2020

(30) Foreign Application Priority Data
Apr. 25, 2019 (FR) ...................................... 1904362

(51) Int. Cl.
*H02M 7/04* (2006.01)
*H02M 1/42* (2007.01)

(52) U.S. Cl.
CPC .............. *H02M 7/04* (2013.01); *H02M 1/42* (2013.01)

(58) Field of Classification Search
CPC .......... H02M 7/04; H02M 1/42; H02M 7/483; H02M 7/48; H02M 7/42; H02M 7/44; H02M 7/66; H02M 2001/0003; H02J 3/388; H02J 3/381; H02J 3/24; H02J 2203/20; H02J 3/40; H02J 3/44; H02J 3/46; H02J 3/48
See application file for complete search history.

(56) References Cited

U.S. PATENT DOCUMENTS

| | | | | |
|---|---|---|---|---|
| 2012/0259477 | A1* | 10/2012 | Abido | ...................... H02J 3/38 700/297 |
| 2014/0015324 | A1* | 1/2014 | Brennan | .................. H02J 3/381 307/72 |
| 2017/0235322 | A1 | 8/2017 | Rahmani et al. | |

FOREIGN PATENT DOCUMENTS

| | | |
|---|---|---|
| CN | 104410097 | 7/2018 |
| CN | 109494800 | 3/2019 |
| EP | 3208907 | 8/2017 |

OTHER PUBLICATIONS

Search Report and Written Opinion for French Patent Application No. FR1904362 dated Jan. 21, 2020, 19 pages.

(Continued)

*Primary Examiner* — Lincoln D Donovan
*Assistant Examiner* — Alex W Lam
(74) *Attorney, Agent, or Firm* — Locke Lord LLP

(57) ABSTRACT

A method for controlling a DC/AC converter connected to an electrical network, the converter being controlled by a control law that is configured to require the converter to operate, by default, in a current source mode, and in case of disappearance of the electrical network, to control the switching of said converter from the current source mode to a virtual synchronous generator mode, the control law being also configured to, as long as the converter is running in the current source mode, monitor the electrical network frequency and phase allowing the initialization of the emulation of the virtual synchronous generator mode, by said control law, at the time of detection of the disappearance of the electrical network.

11 Claims, 3 Drawing Sheets

(56) References Cited

OTHER PUBLICATIONS

Li, F. et al., "Microgrid Technology and Engineering Application", Elsevier Science & Technology, 2015, pp. 19-20.
Bevrani, H. et al., "Virtual synchronous generators: A survey and new perspecives". Electrical Power and Energy Systems 54, 2014, pp. 244-254.
English Language Machine Translation of Chinese Patent Application Publication No. CN109494800, published on Mar. 19, 2019, 26 pages.
English Language Machine Translation of Chinese Patent Application Publication No. CN104410097, published on Jul. 6, 2018, 19 pages.

* cited by examiner

CONTROL METHOD OF A DC/AC CONVERTER

TECHNICAL FIELD

The present invention relates to a method for controlling a DC/AC converter. The present invention relates in particular to a method for controlling a converter in order to switch said converter from a current source mode to a mode in accordance with that of a virtual synchronous generator.

PRIOR ART

DC/AC converters are nowadays widely used in electrical distribution networks. Their use is in particular required due to the emergence of non-conventional energy sources such as renewable energy sources, but also the use of primary reserves such as batteries or else flywheels.

These converters are able to operate in current source mode (or grid tie mode).

More particularly, in this mode of operation, as soon as a converter is connected to an electrical distribution network, it synchronizes with the electrical distribution network via a phase-locked loop (PLL), and supplies it with an active power P and a reactive power Q that are regulated via a power control loop and on the basis of the voltage V and the frequency F of the electrical distribution network.

A converter operating as a current source is easy to use and affords relative stability to the electrical distribution network.

However, in this mode of operation, it is not possible to resort to islanding or to respond to an insufficiency of the network, and in particular a disappearance thereof.

In order to mitigate these drawbacks, another control mode of the converter, called voltage source mode (or grid forming), may also be used.

Among the converters that operate in this mode, virtual synchronous generators (such as the one described in EP 3208907) therefore occupy prime position.

Specifically, these are easily able to be connected in parallel with other energy sources such as generator sets, so as to distribute the loads connected to the electrical distribution network.

However, unlike the current source mode, the virtual synchronous generator mode presents a certain danger to operators and requires particular precautions to be taken during maintenance operations.

A converter that operates in current source mode by default and is capable of switching to a mode in accordance with that of a virtual synchronous generator thus appears to be a particularly beneficial option in order to ensure the stability of the network while at the same time minimizing the risks to operators liable to intervene on the converter during maintenance operations.

This switching from the current source mode to the synchronous generator mode may in particular occur following an intentional disconnection (through programmed islanding) or unintentional disconnection of what is called an infinite bus distribution network.

However, switching between these two modes remains problematic, in particular when the network disappears, and may generate instability in the voltage and the frequency at the output of the converter, as illustrated in FIG. 1.

One aim of the present invention is therefore to propose a method for controlling a converter in order to eliminate the voltage and frequency instabilities liable to occur when said converter is switched from a current source mode to a virtual synchronous generator mode.

Another aim of the present invention is to propose a method for controlling a converter in order to guarantee the safety of people operating on said converter.

SUMMARY OF THE INVENTION

The aims of the invention are achieved at least in part by a method for controlling a DC/AC converter connected to an electrical network, the converter being controlled by a control law that is configured to require the converter to operate, by default, in a current source mode, and in case of disappearance of the electrical network, to control the switching of said converter from the current source mode to a virtual synchronous generator mode, the control law being also configured to, as long as the converter is running in the current source mode, monitor the electrical network frequency and phase allowing the initialization of the emulation of the virtual synchronous generator mode, by said control law, at the time of detection of the disappearance of the electrical network.

According to one mode of implementation, the control law comprises two routines, respectively called current source routine and synchronous generator routine, respectively controlling the converter in current source mode and controlling the converter in virtual synchronous generator mode.

According to one mode of implementation, the current source routine comprises a phase-locked loop which, based on the frequency and the angle of the calculation network, makes it possible to synchronize the current delivered by the converter to the electrical network in terms of phase and phase angle.

According to one mode of implementation, the current source routine also comprises a power control loop intended to estimate a reference current that the converter has to deliver on the basis of an active power P and a reactive power Q that are necessary for the electrical network to operate.

According to one mode of implementation, the synchronous generator routine continuously calculates a reference current and a reference voltage that are compatible with the operation of a synchronous generator configured to form the network.

The reference current is in particular a current that a synchronous generator would provide if it were to be subject to the voltage measured across the output terminals of said converter.

According to one mode of implementation, the frequency and the phase of the network that are monitored by the control law are used to synchronize the reference voltage and the reference current that are calculated by the synchronous generator routine.

According to one mode of implementation, the control law furthermore comprises a switching management module which, by default, requires the converter to be controlled by the current source routine and, as soon as a network disappearance occurs, requires the converter to be controlled by the synchronous generator routine.

The invention also relates to a computer program comprising instructions that, when the program is executed by a computer, lead to the control method according to the present invention being implemented.

The invention also relates to a DC current to AC current converter provided with the computer program according to the present invention.

BRIEF DESCRIPTION OF THE DRAWINGS

Other features and advantages will become apparent in the following description of the modes of implementation of the method for controlling a DC/AC converter according to the invention, given by way of non-limiting examples and with reference to the appended drawings in which:

FIG. 1 in particular shows the effect of the switching, at the time $t_1$, from a current source mode (area GT) to a virtual synchronous generator mode (area GF) for a converter according to a control method known from the prior art, the area A defines a time period associated with an instability of the voltage;

DETAILED DESCRIPTION OF PARTICULAR EMBODIMENTS

The invention relates to a method for controlling a DC/AC converter (hereinafter converter). The invention relates more particularly to a method for controlling a converter in order to switch said converter from a current source mode to a mode in accordance with that of a virtual synchronous generator.

According to the present invention, the converter may be a DC current to AC current converter or a DC voltage to AC voltage converter. The remainder of the description will however be limited to the use of a voltage converter.

The control method is executed by a control law that requires, by default, the converter to operate in current source mode and, in the event of disappearance of the electrical network, in particular an infinite bus electrical network, controls the switching from the current source mode to the virtual synchronous generator mode.

The control law is moreover configured to continuously monitor the frequency and the phase of the network, and to emulate the virtual synchronous generator mode based on these data. This emulation, which is executed as a background task when the converter operates in current source mode, makes it possible to switch from the current source mode to the virtual synchronous generator mode, without interrupting the power for the electrical load or loads, as soon as a fault with the network or islanding thereof occurs.

Figure 2:
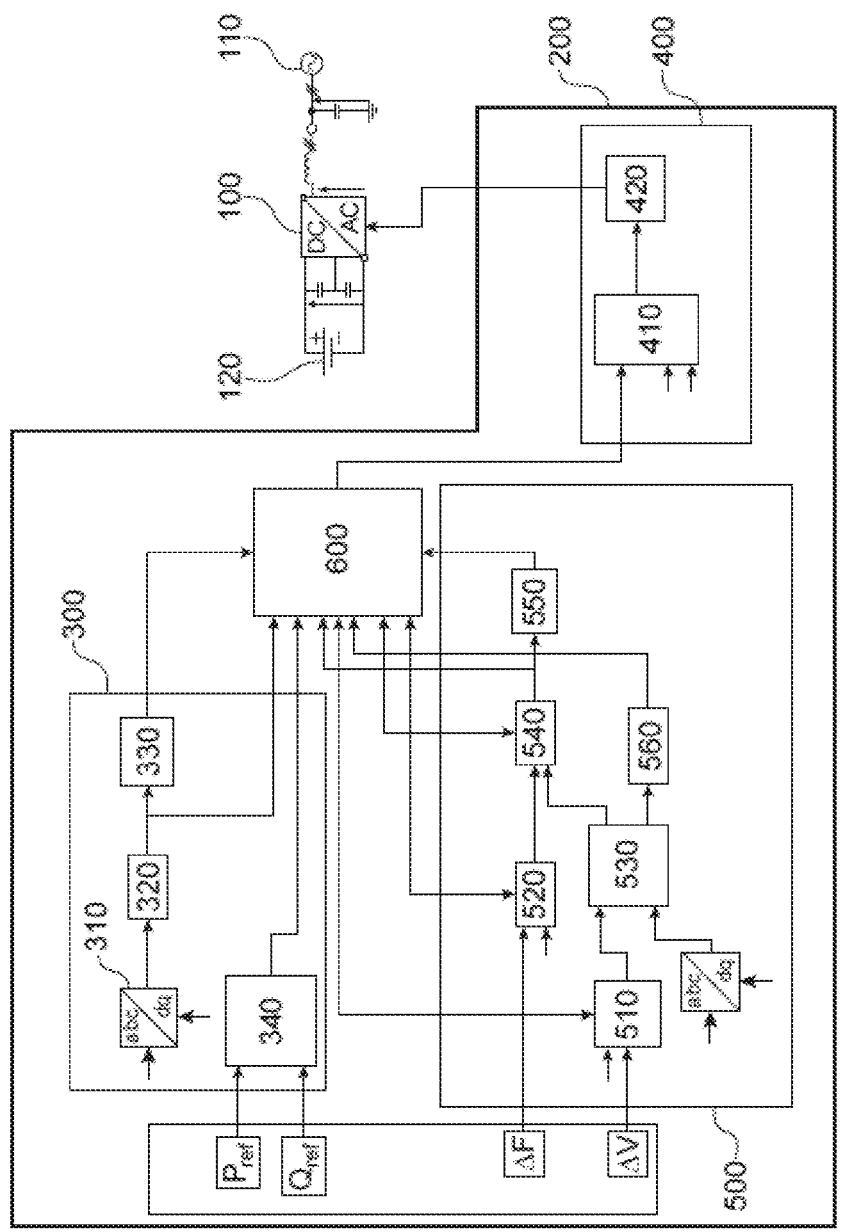
FIG. 2 is a depiction of a converter according to the present invention in functional modules.

FIG. 2 is a schematic depiction of the various blocks of a control law 200 able to be used to control a converter 100 according to the present invention.

The converter 100 is connected to an electrical distribution network 110 that is subject to a voltage V of frequency f and phase angle α (hereinafter the phase α) that are imposed by one or more voltage sources able to form the network.

The converter 100 converts the DC voltage generated by an energy source 120 into an AC voltage.

The energy source 120 may comprise a DC voltage source. A DC voltage source may for example comprise photovoltaic panels, wind turbines, marine power systems, thermodynamic machines, batteries or else flywheels.

The converter 100 may comprise, in the case of a three-level inverter, two capacitors $C^+$ and $C^-$ connected together in series to form an equivalent capacitor C. The terminals of the equivalent capacitor C are electrically connected, for example in parallel, to the terminals of the energy source 120.

Using two capacitors $C^+$ and $C^-$ makes it possible to guarantee a non-deformed sinusoidal shape of the current supplied by the converter 100 to the electrical distribution network. The invention is however not limited to the use of a three-level inverter.

The operation of the converter 100 is governed by a control law 200.

The control law 200 in particular requires the converter to operate by default in current source mode (grid tie mode).

In other words, in this mode of operation, the converter 100 is subject to the frequency f and the phase angle α that are imposed by the network 110.

"Frequency f and phase angle α of the network" is understood to mean the frequency and the phase of the voltage of the electricity distribution network 110.

In this respect, the control law 200 may comprise a routine dedicated to this mode of operation, called current source routine 300.

The current source routine 300 may in particular comprise a Park module 310, a PLL module 320 (PLL for phase-locked loop), a module 330 for calculating the phase of the network and a PCL module 340 (PCL for power control loop).

The Park module 310 is in particular dedicated to tracking the voltage $V_{abc}$ of the network, the frequency f and the phase α of which are extracted, respectively, by the PLL module 320 and the calculation module 330.

The role of the Park module 310 is in particular to transform the voltages, for example the three AC voltages $V_{abc}$ of the network 110, into two DC voltages $V_{dq}$ that are used by the modules 320 and 330 to respectively estimate the frequency and the phase of the network 110.

The PCL module calculates a reference current $I_{ref,GT}$ associated with an active power $P_{ref}$ and a reactive power $Q_{ref}$ that the converter 100 has to deliver to the electrical distribution network 110.

The control law 200 also comprises a current regulation routine 400 provided with a current regulation module 410 and with a pulse generation module 420 (PWM or pulse width modulation).

The pulse generation module 420 in particular requires the converter 100 to apply duty cycles, calculated by the current regulation module 410, and allowing said converter to deliver, to the electrical distribution network, the current $I_{ref,GT}$ at the frequency f and at the phase α of the network 110.

The control law 200 is also designed to require a switch from the current source mode to a virtual synchronous generator mode in the event of disappearance of the network.

The "disappearance of the network" may for example occur following a fault therewith or islanding, for example programmed islanding.

According to the present invention and as described in EP 3208907, the synchronous generator mode is a mode in which the converter behaves as a generator set.

In this respect, the control law 200 may comprise a routine dedicated to this mode of operation, called synchronous generator routine 500.

A generator set generally comprises a rotor driven in rotation within a stator and an automatic voltage regulator (AVR) acting on the rotor windings of the rotor. The automatic voltage regulator thus applies a voltage to the rotor windings depending on the RMS voltage $V_{rms}$ (of the voltage V) delivered by the stator (by the generator set) on the network. The voltage/reactive power Q droop control allows the generator set to adjust the RMS voltage $V_{rms}$ that it delivers depending on the reactive electric power Q that it supplies.

Moreover, the rotor of a generator set is generally driven in rotation within a stator by a shaft of an internal combustion engine (for example a diesel engine). By virtue of its design, the generator set is capable of forming the network. In other words, the generator set may impose the voltage V and the frequency f on an electrical network.

According to the present invention, the synchronous generator routine 500 comprises modules 540 and 550, described in more detail in the remainder of the description, which respectively continuously generate the frequency f and the phase α of the network. More particularly, the modules 540 and 550 are continuously initialized at the frequency and the voltage of the network in cooperation with a switching management module 600. This initialization of the modules 540 and 550 also makes it possible to calculate a reference current $I_{ref,GF}$ that a generator set capable of forming the network would deliver.

These parameters are not however communicated to the current regulation routine 400 for as long as the converter 100 operates in current source mode. In other words, the modules 540 and 550 of the synchronous generator routine 500 run as a background task for as long as no fault with the network is detected or as long as no islanding order is issued. In particular, these modules 540 and 550 are constantly initialized at the frequency and at the angle of the network.

Thus, as soon as a fault with the electrical distribution network 110 occurs, the synchronous generator routine 500 takes over from the current source routine 300 virtually instantaneously and requires the converter 100 to behave as a synchronous generator, such that said converter is able to form the network.

In other words, as soon as the converter is connected to the network, and regardless of the mode of operation of the converter, the synchronous generator routine 500 continuously calculates the current $I_{ref,GF}$.

This switching from the current source mode to the synchronous generator mode may be controlled by a switching management module 600 that requires, by default, the converter to be controlled by the current source routine and, in the event of a fault with the network, requires the converter to be controlled by the synchronous generator routine.

The switching management module 600 thus makes it possible to continuously and correctly initialize the internal states of the control through the synchronous generator routine 500, such that the latter is "ready" at the time of the switching from the current source mode to the virtual synchronous generator mode. Thus, according to the present invention, it is possible to limit transient effects on the current and the voltage during switching.

The synchronous generator routine 500 may, in accordance with the virtual synchronous generator described in EP 3208907, comprise an AVR module 510 (AVR for automatic voltage regulator), a governor module 520, a synchronous machine module 530, the mechanical equations module 540 and the module 550 for calculating an internal angle of the synchronous machine, and a current limitation module 560.

The AVR module 510 is in particular intended to regulate the voltage across the output terminals of the converter 100.

The governor module 520 is intended to regulate the frequency of the current liable to be delivered by the converter.

The synchronous machine module 530 comprises all of the differential equations relating to the electrical operation of a synchronous machine that is a component of a generator set.

The mechanical equation module 540 comprises the mechanical equations of a rotating shaft.

The method according to the present invention therefore makes it possible to limit transient effects caused by the switching from the current source mode to the virtual synchronous generator mode.

Figure 3A:
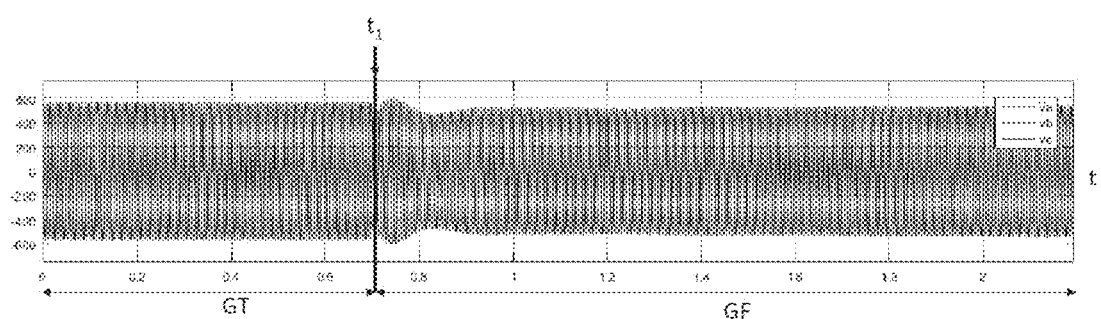
FIG. 3a and FIG. 3b illustrate the evolution, respectively, of the voltage $V_{abc}$ (vertical axis) and of the magnitude of the current (vertical axis) as a function of time following a loss of network at a time $t_1$.
Figure 3B:
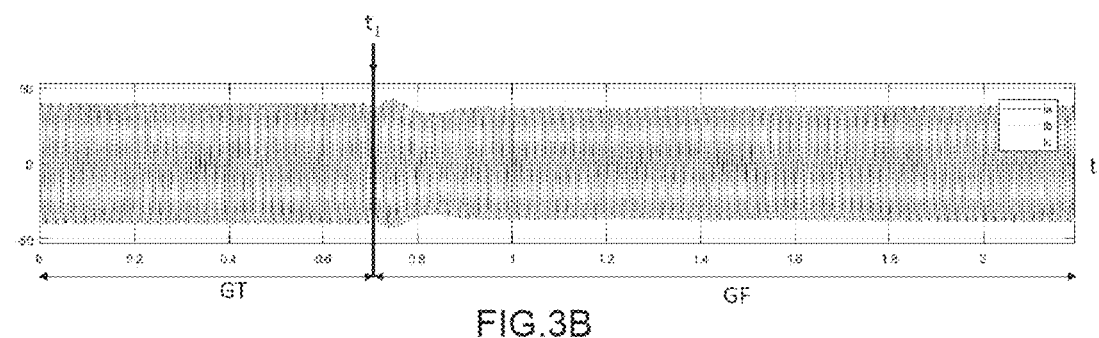

By way of illustration, FIGS. 3a and 3b show a simulation of the method according to the present invention.

FIGS. 3a and 3b in particular show the evolution, respectively, of the voltage $V_{abc}$ (vertical axis) and of the magnitude of the current (vertical axis) as a function of time following a loss of network at a time $t_1$.

In these figures, before the time $t_1$, the converter is controlled by the current source routine. Following a loss of network at the time $t_1$, switching of the control of the converter from the current source routine to the synchronous generator routine takes place.

Figure 1:
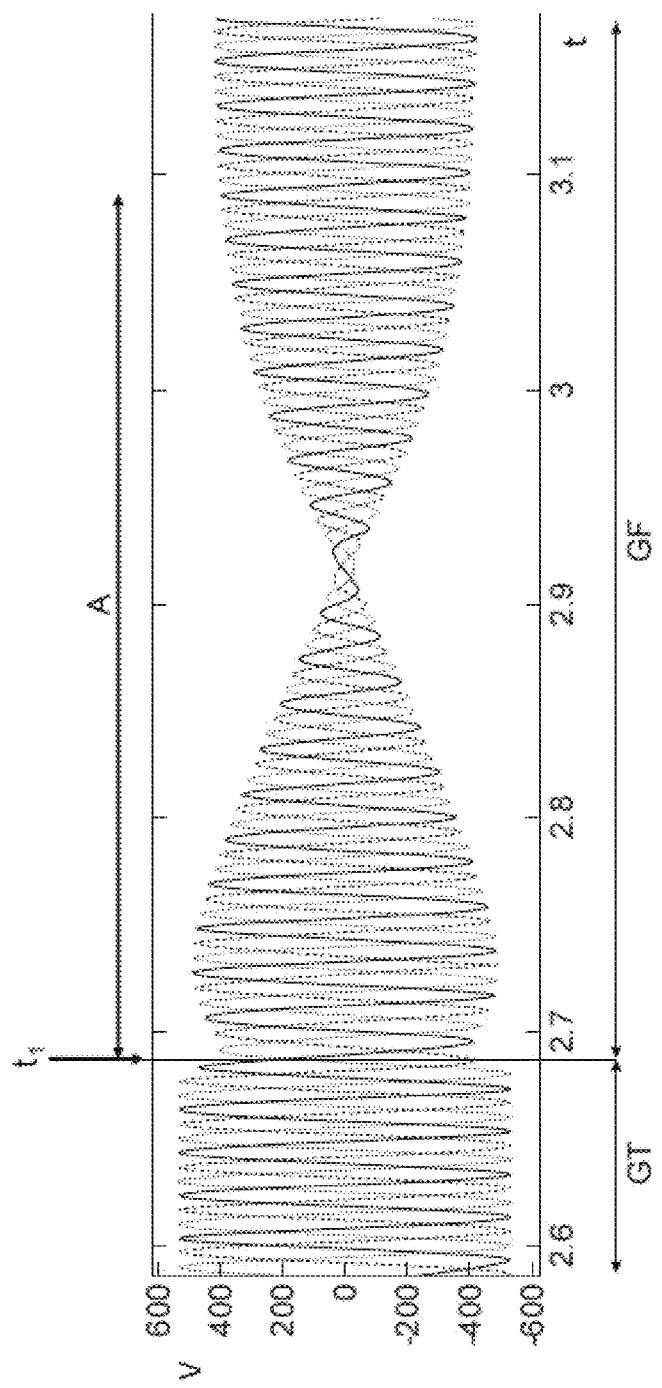
FIG. 1 is a graph of the voltage V (vertical axis, in volts) as a function of time t (horizontal axis, in s)

This switching takes place, unlike the switching observed in FIG. 1, without any major instability.

The invention also relates to a computer program comprising instructions that, when the program is executed by a computer, lead to the control method according to the present invention being implemented.

The invention also relates to a DC/AC converter provided with the computer program according to the present invention.

The invention claimed is:

1. Method for controlling a DC/AC converter connected to an electrical network, comprising:
controlling the converter by a control law that is configured to require the converter to operate, by default, in a current source mode;
in case of disappearance of the electrical network, controlling by the control law switching of said converter from the current source mode to a virtual synchronous generator mode; and
running a background task by the control law, as long as the converter is running in the current source mode, to continuously monitor the electrical network frequency and phase and to emulate the virtual synchronous generator mode based on the monitored electrical network frequency and phase, allowing the switching from the current source mode to the virtual synchronous generator mode, by said control law, at a time of detection of a disappearance of the electrical network;
wherein the background task comprises emulating mechanical shaft rotation of a generator set capable of forming the network to continuously generate frequency and phase angle of the network.

2. Method according to claim 1, wherein the control law comprises two routines, respectively called current source routine and synchronous generator routine, respectively controlling the converter in current source mode and controlling the converter in virtual synchronous generator mode.

3. Method according to claim 2, wherein the current source routine comprises a phase-locked loop configured to estimate the frequency and allow a phase calculation module to calculate the phase of the network.

4. Method according to claim 3, wherein the current source routine also comprises a power control loop intended to estimate a reference current that the converter has to deliver on the basis of an active power P and a reactive power Q that are necessary for the electrical network to operate.

5. Method according to claim 2, wherein the synchronous generator routine continuously calculates a reference current and a reference voltage that are compatible with the operation of a synchronous generator configured to form the network.

6. Method according to claim 5, wherein the frequency and the phase of the network that are monitored by the control law are used to synchronize the reference voltage and the reference current that are calculated by the synchronous generator routine.

7. Method according to claim 6, wherein the reference voltage and the reference current are also calculated by the synchronous generator routine when the converter operates in current generator mode.

8. Method according to claim 2, wherein the control law furthermore comprises a switching management module which, by default, requires the converter to be controlled by the current source routine and, as soon as a network disappearance occurs, requires the converter to be controlled by the synchronous generator routine.

9. Computer program product comprising a non-transitory computer-readable medium having computer-readable instructions stored thereon, the computer-readable instructions, when executed by a computer, cause the method according to claim 1 to be implemented.

10. DC/AC converter provided with the computer program product according to claim 9, further comprising:
   a current source routine configured to control the converter in the current source mode; and
   a synchronous generator routine configured to control the converter in the virtual synchronous generator mode.

11. Method according to claim 1, wherein the DC/AC converter forms the electrical network when controlled by the control law to operate in the virtual synchronous generator mode in case of disappearance of the electrical network.

\* \* \* \* \*